Figure 1:
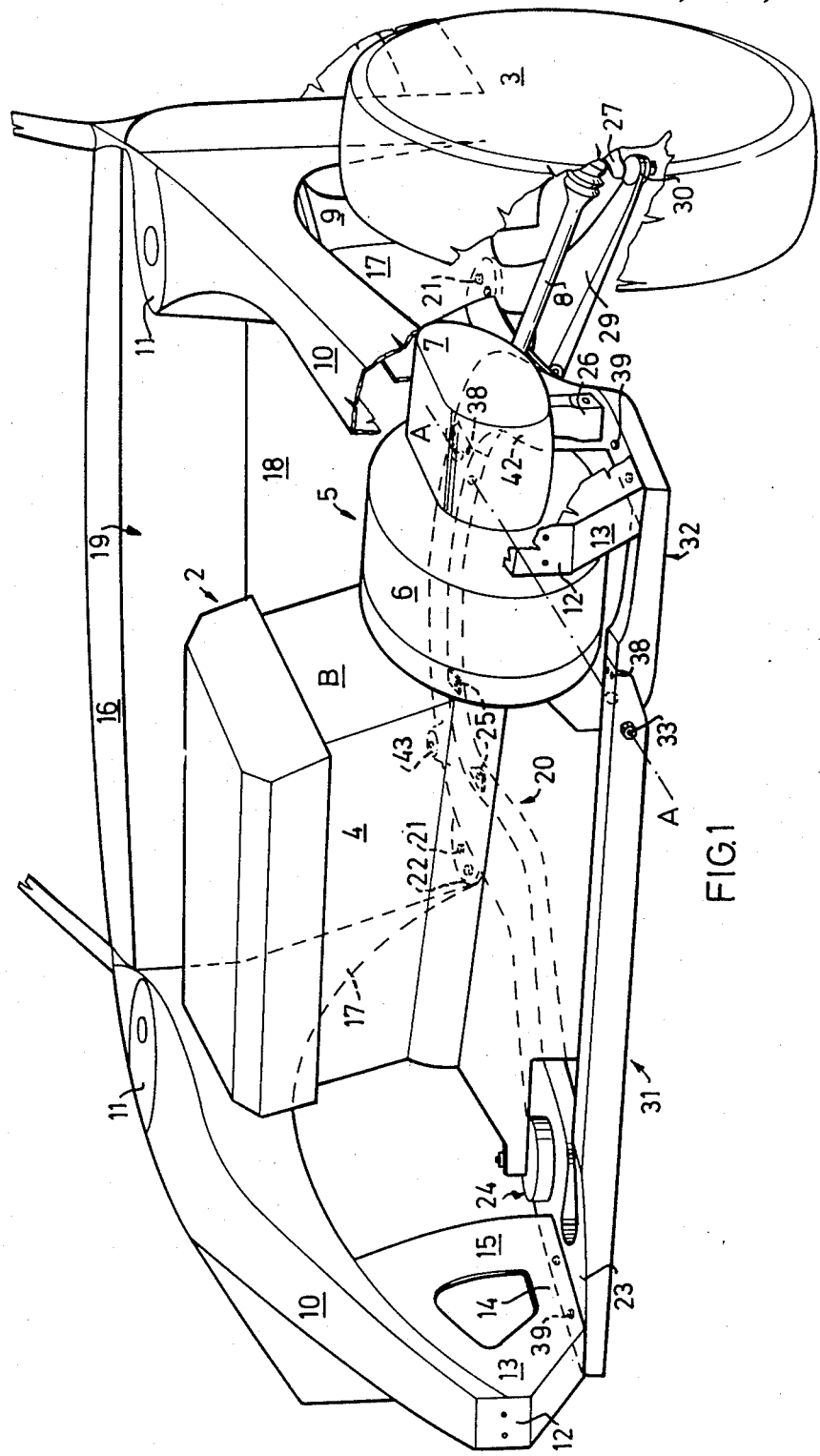

United States Patent [19]

Norlin

[11] Patent Number: 4,618,023

[45] Date of Patent: Oct. 21, 1986

[54] ARRANGEMENT IN A VEHICLE WITH A DRIVE UNIT MOUNTED IN A SUBFRAME

[75] Inventor: Stig I. Norlin, Kungshamn, Sweden

[73] Assignee: Saab-Scania Aktiebolag, Sodertalje, Sweden

[21] Appl. No.: 678,973

[22] Filed: Dec. 6, 1984

[30] Foreign Application Priority Data

Dec. 8, 1983 [SE] Sweden .............................. 8306768

[51] Int. Cl.$^4$ ............................................. B62D 21/00
[52] U.S. Cl. .................................... 180/312; 180/291; 280/781
[58] Field of Search ................ 248/635; 180/312, 297, 180/299, 291; 267/140.1; 280/781, 785

[56] References Cited

U.S. PATENT DOCUMENTS

| | | | |
|---|---|---|---|
| 4,263,980 | 4/1981 | Harlow, Jr. et al. | 180/312 |
| 4,535,867 | 8/1985 | Botar | 180/312 |

*Primary Examiner*—Richard A. Bertsch
*Attorney, Agent, or Firm*—Cushman, Darby & Cushman

[57] ABSTRACT

The invention relates to an arrangement in a motor vehicle where a drive unit for driving the vehicle is mounted on a subframe in the vehicle. The subframe is affixed from below to carrying parts of the vehicle with the aid of attachment elements.

For repair and service of larger parts such as clutch and gearbox included in the drive unit, it is normally required that the entire subframe and the drive unit are released and removed from the vehicle in order to get access to the drive unit part in question. With the object of enabling solely taking out the drive unit part which is to be repaired or serviced, it is directed in accordance with the invention that the subframe is divided into a first and a second subframe part which are mutually pivotable about a substantially horizontal axis. After undoing and/or removing the attachment elements fixing the first subframe part, this subframe part can be swung downwards to a position enabling removal of parts from the vehicle.

11 Claims, 2 Drawing Figures

ARRANGEMENT IN A VEHICLE WITH A DRIVE UNIT MOUNTED IN A SUBFRAME

The invention relates to an arrangement in a motor vehicle with a drive unit mounted on a subframe which is removably attached to carrying parts of the vehicle via fastening elements.

In modern cars with pontoon bodies, there is often included in the carrying structure of the body a so-called subframe for supporting the drive unit of the car. In assembling the car, the subframe with its drive unit can be mounted from below in a space in the car body provided for it, for fastening to the surrounding carrying body structure.

The solution signifies in principle that the reverse procedure must be applied in dismantling large parts of the drive unit, e.g. when a transmission unit such as the clutch or gearbox must be taken out of the car for repairs and service. This is no problem for large workshops having equipment intended for these operations. On the other hand, if this equipment is lacking, which may be the case with smaller workshops, the operation often becomes time-consuming and physically heavy to carry out manually if it can be done in this way at all.

A solution used for a long time in motor vehicles for fitting and removing the vehicle drive unit, or parts thereof, is lifting up from or down into the engine compartment. In attempts in optimum utilization of the engine compartment, the implementation of the body carrying structure can, however, often lead to this method not being able to be practiced without considerable difficulty. This is particularly so if the drive unit is placed transverse the direction of travel of the vehicle. Arrangements with subframes have consequently been applied to an increasing extent with transverse drive units, since fitting into the engine compartment takes place simplest from below in these cases.

The present invention has the object of arranging a subframe which enables simplified removal of parts of the drive unit for service and repairs. With this object in view, the invention is distinguished in that the subframe comprises a first and a second subframe part, articulated in relation to each other about a substantially horizontal axis, and in that the first subframe part can be caused to swing into a position allowing fitting and removal of parts of the drive unit.

As a result of the subframe articulation, one part of the subframe can be swung down into a vertical position without any physical stress on the mechanic after releasing a few fastening elements. Parts of the drive unit which relatively often require repairs or service, e.g. clutch and gearbox, are then accessible from below. Such a drive unit part, after being released from surrounding parts, can be lowered with a simple lifting device and taken out of the engine compartment for being placed on a bench for subsequent detail work.

A preferred embodiment of the invention is applied in vehicles with a transverse drive unit in the form of an engine with a built-on transmission unit. In this case the axis of articulation for the subframe part is situated in a plane transverse the engine drive shaft, preferably in the vicinity of a vertical partition plane between the engine and the transmission unit. Exposure of the transmission unit is thus obtained when one subframe part is swung down, as well as the possibility of taking out the engine unit if it is decided to swing down the other subframe part.

Other distinguishing features of the invention are apparent from the following description of an exemplifying embodiment and from the accompanying claims. The description is performed with reference to the accompanying figures, of which FIG. 1 is a schematic perspective view of the front part of a passenger car with a drive unit installed on an inventive subframe, and FIG. 2 illustrates in the same way the inventive subframe with an articulated part in a downwardly swung position.

Figure 2:
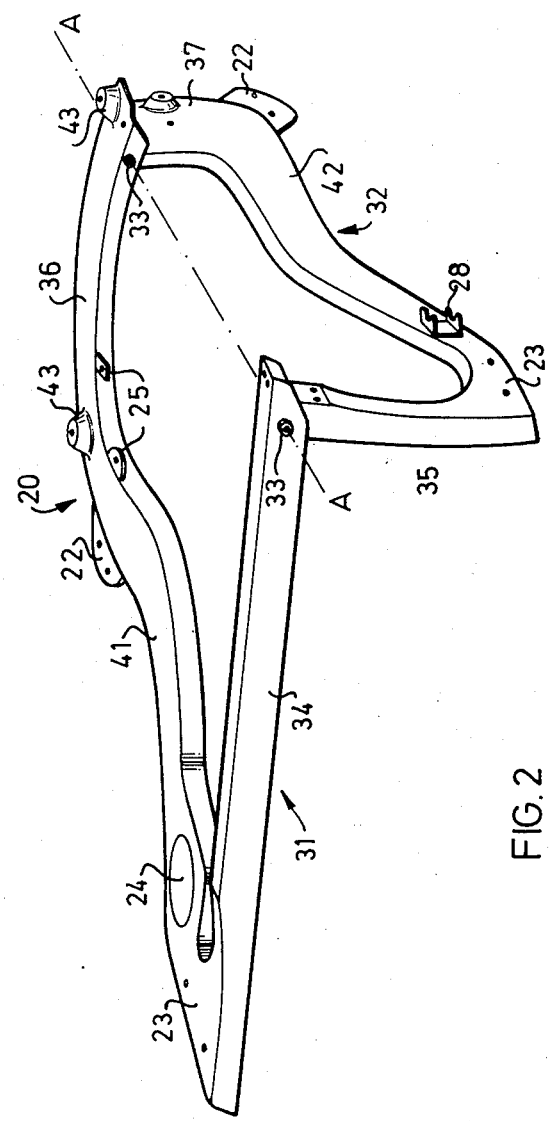

It will be seen from FIG. 1 that a transverse drive unit 2 is placed in the forward carrying structure of a passenger car. The unit is adapted conventionally to drive the front wheels 3 of the car, only one wheel being depicted in the figure. The drive unit 2 includes an ordinary internal combustion engine 4, the crankshaft (not shown) of which transfers power to a transmission unit 5 comprising a clutch 6, a gearbox 7 and a differential gear not shown here, a drive shaft 8 going from the latter to the respective front wheel.

Hereinafter in the description there are used terms such as right, left, forward and backward which, together with the terms longitudinal and transverse, are used in relation to the forward travel direction of the car.

The forward carrying structure of the car comprises along each side of the vehicle a forwardly directed upper member 10. Said member runs from an upper mounting 11 for the front wheel McPhearson strut 9 slopingly forwards downwards to a flat front surface 12 for connection to a transverse front bumper bar (not shown). The member 10 is provided with a dependent configuration 13-15 the front part of which is a member 13 having a backward inclination. The member 13 merges into a horizontal longitudinal member 14 which is connected to the member 10 via a substantially vertical strut 15.

On the left-hand side of the car in FIG. 1, the members 10, 13, 14, 15 are cutaway to better illustrate the transmission unit 5 and its attachment to the subframe 20.

From the mounting 11, the member 10 extends backwards to connect up with the transverse windshield support member 16. At the mounting 11, the member 10 merges into a downwardly backwardly directed strut 17, which connects up with a cowl panel 18. The cowl panel 18 separates a front space accommodating the drive unit 2 from the passenger compartment of the car, this front space being denoted hereinafter the engine compartment 19.

A rear corner of an inventive subframe 20 is attached to the carrying structure of the car body adjacent the connection of each strut 17 to the cowl panel 18. The rear corners of the subframe 20 are formed with flat lugs 22 and by bolted joints 21 connect the subframe 20 to abutment surfaces at the juncture between the strut 17 and the cowl panel 18. On either side of the car there are screw joints 39 connecting the respective front corners 23 of the subframe 20 from below to the member 14.

As will be seen the subframe 20, separately illustrated in FIG. 2, comprises two parts 31 and 32 pivotably jointed to each other, pivotable along an axis A—A. In practice, pivoting is enabled by bolts 33 situated at the axis, these bolts passing through forward crossbeams 34,35 of the parts and through rear crossbeams 36,37 of the parts.

According to FIG. 1, the subframe 20 has a substantially rectangular configuration in a normally fitted condition in the car. A substantially longitudinal member 41 on the right side of the subframe connects the crossbeams 34,36 to each other, and a member 42 on the lefthand side of the subframe similarly connects the crossbeams 35,37 to each other. At the right front corner 23 of the subframe there is a support surface 24 on which there is disposed a sound-damping drive unit attachment for the engine 4. The engine 4 is further adapted to rest against attachment points 25 near to the rear right corner of the subframe. The left side of the drive unit 2 rests against the member 42 via a bracket 26 formed on the gearbox, this bracket resting via a rubber cushion against a support 28 formed on the member 42.

The rear crossbeams 36,37 of the subframe 20 further have two raised support surfaces 43 constituting fastening points for the steering gear (not shown) of the car. Pivoting arms 29 included in the front wheel suspension are attached to the rear part of the respective members 41,42 of the subframe 20. Only the left pivoting arm 29 is illustrated in FIG. 1. For attaching the rear mounting of the pivoting arm 29 to the subframe 20 there is utilized the same bolted connection 21 as used for connecting the subframe 20 to the carrying structure of the body at the corner lug 22. The pivoting arm 29 is mounted conventionally at the king pin housing 27 via a ball joint 30.

In the region of the axis A—A the crossbeams 34,36 of the subframe part 31 have a cross-section accommodating the corresponding section of the crossbeams 35,37 of the subframe part 32. As an example of such a cross-section, the members 34,35,36,37 in the figures are illustrated with channel cross-sections with the toes pointing downward. The crossbeams 34,36 of the subframe part 31 extend past the axis A—A in a direction towards the other subframe part 32. The subframe part 31 thus accommodates the end portions of the crossbeams 35,37, and furthermore has holes for screw joints 38 with the aid of which the subframe parts 31,32 are secured relative to each other when the subframe 20 serves as a unit. One of the rear bolted joints 38 is furthermore integrated with the raised support surface 43, thus simultaneously serving as an attachment means for the car steering gear.

As is apparent from FIG. 1, the axis A—A is located in the region of a substantially vertical partition plane B between the engine 4 and the transmission unit 5. Since it is more usual that the transmission unit 5 needs to be taken out of the engine compartment 19 for repairs and service than the engine 4, the subframe part 32 is primarily intended to be swung down relative the subframe part 31, which is rigidly connected to the carrying structure of the car. To achieve the intended exposure of the transmission unit 5 on swinging the subframe part 32 downwards, the axis A—A should be located at a distance from the partition plane B which is less than half the distance between the partition plane B and the side member 42.

Removal of the transmission unit from the engine compartment 19 is accomplished according to the following method. It must be first ensured that the engine does not load the left part 31 of the subframe, which for a downwardly swung subframe part 32 will hang freely without support in the carrying structure of the car. If the engine lacks a support point for the duration of the operation to the surrounding structure, the left end of the engine must be secured to the body structure before dismantling work is started. This can be done with simple aids, such as chain, rope, bar or the like, which unload the left end of the subframe part 31 from the weight of the engine 4. A lifting device, e.g. a garage jack or a winch is then arranged to apply an upwardly directed force to the transmission unit 5 to unload the subframe part 32 from its weight. After connections such as gear changing mechanism, tachometer cable and/or drive shafts are separated, the fastenings of the subframe part 32 are loosened. These are the screwjoints 21, 38 and 39 which are removed entirely. The pivoting bolts 33 are also loosened, and the gearbox attachment 26,28 is parted as well as the connection of the pivoting arm 29 to the ball joint 30 at the wheel 3. The subframe part 32 with associated pivoting arm 29 can then be swung down to a vertical position. Alternatively, the pivoting arm 29 can be removed entirely from the side member 42 of the subframe instead of at the ball joint 30, the arm 29 then being still attached to the king pin housing 27 when the subframe part 32 is swung downwards.

With the subframe part 32 swung down in a vertical position, the transmission unit 5 can be separated from the engine 4 with the aid of the lifting device. This is done in a usual manner by a short sideways movement of the transmission unit 5 to clear its input shaft from the engine flywheel (not shown).

To enable the exposing movement, an opening is required in the body carrying structure immediately to the left of the transmission unit 5. The opening can be normally covered by a plate which thus forms a portion of the adjacent wheel housing. The plate is kept in place by a number of screws and is easily removable for the operation in question. The transmission unit 5 can then be lowered down and out from the engine compartment 19. Fitting the unit takes place in the reverse order.

The described embodiment is not to be regarded as restricting the invention, which can be modified in a plurality of embodiments within the scope of the following claims.

What I claim is:

1. Arrangement in a motor vehicle of the passenger car type having a drive unit mounted on a subframe, which subframe is removably attached to carrying parts in the vehicle via attachment elements, and which comprises a first and a second subframe part, characterized in that the subframe parts are articulated in relation to each other about at least two pivoting joints, said joints being separately positioned along a substantially horizontal axis, whereby said first subframe part can be caused to swing into a position allowing fitting and removal of parts of the drive unit.

2. Arrangement as claimed in claim 1, characterized in that with a common chief plane the first and the second subframe part are affixed to carrying parts of the vehicle with the aid of a plurality of screw joints.

3. Arrangement as claimed in claim 2, characterized in that the fastening elements acting on the first subframe part include elements connecting this part to the drive unit and to a wheel suspension means included in the vehicle.

4. Arrangement as claimed in claim 3, characterized in that the fastening elements acting on the first subframe part include elements connecting this part to the other subframe part also.

5. Arrangement as claimed in claim 1, where the drive unit is an engine transversely oriented in the vehicle and attached to a transmission unit, characterized in that the axis is substantially situated in a plane which is transverse the engine crankshaft, and which is located in the vicinity of a vertical partition plane between the engine and the transmission unit.

6. Arrangement as claimed in claim 5, characterized in that the axis is situated at a distance from the partition plane which is less than half the distance between the partition plane and a side member substantially parallel to the partition plane and pertaining to the first subframe part.

7. Arrangement as claimed in claim 5, characterized in that the second subframe is situated under the engine and is connected to it via attachment elements.

8. Arrangement as claimed in claim 1, characterized in that the second subframe part has a downwardly open section in an area on either side of the axis, at least partially accommodating a corresponding section of the first subframe part when the first subframe part is not swung downwards.

9. Arrangement as claimed in claim 8, characterized in that the section of the second subframe part is a channel section extending past the axis towards the first subframe part to overlap it.

10. Arrangement as claimed in claim 9, characterized in that in the region of the subframe where the subframe parts overlap each other there are attachment elements which secure the subframe parts relative each other when the first subframe part is not swung downwards.

11. Drive unit mounting arrangement for a passenger motor vehicle comprising a drive unit, including an engine and a transmission mounted on a subframe, said subframe attached to carrying parts in the vehicle by attachment elements, wherein said subframe includes first and second subframe members, said members joined relative to one another about at least two pivoting joints, wherein said joints are separately positioned along a substantially horizontal axis such that the first subframe part is rotatable about said horizontal axis, and wherein said substantially horizontal axis is positioned such that said axis is the vicinity of a vertical plane between said engine and transmission.

* * * * *